United States Patent [19]

Prochazka et al.

[11] 3,855,368

[45] Dec. 17, 1974

[54] APPARATUS FOR BRINGING FLUID PHASES INTO MUTUAL CONTACT

[75] Inventors: Jaroslave Prochazka; Vladimir Rod, both of Prague, Czechoslovakia

[73] Assignee: Ceskoslovenska akademie ved, Praha, Czechoslovakia

[22] Filed: Apr. 26, 1972

[21] Appl. No.: 247,621

[52] U.S. Cl............................ 261/81, 259/4, 259/27, 261/82
[51] Int. Cl............................................. B01f 3/04
[58] Field of Search.............................. 261/81-82, 261/113; 259/27, 4

[56] References Cited
UNITED STATES PATENTS

| 835,118 | 11/1906 | Sorensen | 261/82 X |
|---|---|---|---|
| 2,061,830 | 11/1936 | Campbell | 261/113 |
| 2,460,004 | 1/1949 | Green et al. | 261/82 |
| 2,561,669 | 7/1951 | Macq | 261/81 |
| 2,667,407 | 1/1954 | Fenske et al. | 261/81 X |
| 3,016,234 | 1/1962 | Huppmeier | 261/98 |
| 3,330,535 | 7/1967 | Stengel | 261/81 X |
| 3,488,037 | 1/1970 | Prochazka et al. | 261/81 X |
| 3,549,134 | 12/1970 | Karpacheva | 261/82 X |

*Primary Examiner*—Tim R. Miles
*Assistant Examiner*—Richard L. Chiesa
*Attorney, Agent, or Firm*—Michael S. Striker

[57] ABSTRACT

The apparatus consists of an upright vertical column for bringing fluid phases into mutual contact, comprising a set of perforated trays and means for bringing said trays and the fluid phases into relative movement. Each tray is provided with both small and large apertures of which the former designed for passing a dispersed phase of phases are positioned opposite the large apertures in the adjacent trays, and vice versa, the lastmentioned large apertures being designed for passing a continuous phase or phases. Relations between areas of the two apertures sized, between the number of large apertures and the sum of all apertures, and between total perforated and solid areas of the tray are specified. The large apertures are provided with slanted, or tangential extensions as to control a helical phase flow course respective to the column axis. The apparatus operates upon counterflow principle, a lighter phase ascending to the column top and a heavier phase falling down to the bottom thereof. The group of small and large apertures are regularly staggered in the trays in such a way that the path of the cross-flow of the continuous phase between large apertures of adjacent trays is sufficiently long to secure the desired efficiency of the extraction but simultaneously sufficiently short to avoid too long pressure gradients.

3 Claims, 11 Drawing Figures

APPARATUS FOR BRINGING FLUID PHASES INTO MUTUAL CONTACT

The present invention relates to an apparatus for bringing two or more fluids into mutual contact, of which fluids one can be gas and at least two of them are either insoluble or only limitedly soluble in one another. A mutual contact of fluids can be achieved by dispersing phases in one another whereby a diffusion of the fluid components or heat transfer between the phases are enabled. The apparatus according to the invention can be utilized for extraction of liquid substances, both absorption and desorption of gases, for rectification of liquid mixtures, and for carrying out chemical reactions in liquid phase mixtures.

To the aforementioned purposes, there are usually used in practice columns with vibratory perforated trays, i.e. so-called vibrating columns, or with pulsating fluid, i.e. so-called pulsating columns. A particularly satisfying effect has been found with trays provided, in addition to a large number of apertures designed for dispersing a dispersed phase or phases, with a smaller number of apertures of substantially larger areas allowing predominantly the passage of a continuous phase. The apertures for dispersed phase are, as a rule, of circular cross-section and of less than 10 mm. diameter, while the continuous phase apertures can possess arbitrary contours, and the area of each of them is at least three times larger than that of the dispersed phase aperture. In case the trays oscillate at a frequency of from 0.5 to 40 sec.$^{-1}$ and at an amplitude of from 0.5 to 20 mm., all of them can either be moved in unison, or the motion of particular trays or tray groups can differ in amplitude, frequency or phase. Apart from the aforesaid trays the columns may be provided with additional inbuilt elements designed to control the phase flow or asisting in phase dispersing.

The apertures for both dispersed and continuous fluid phases are to be spaced apart on the particular column trays in such a way that the flows of the continuous phase and of the dispersed one cross each other in the space between the trays, which means that the continuous phase may advance between the trays in substantially radial direction while the dispersed phase along the vertical column axis. This could be attained in that all the larger apertures within a particular tray are disposed on one half of the same whereas within the adjacent column tray the other way about, or, alternately, in that the larger apertures are provided around the central portion of the one tray while around the periphery of the adjacent tray. The latter arrangement has been disclosed in Czechoslovak Pat. Specifications Nos. 106,313, 132,022 and 139,895.

All the afore-described arrangements meet the conditions encountered with small-diameter columns where they contribute to their relatively high efficiency. On the other hand, with large-diameter columns the length of continuous phase flow across the column becomes extended, and consequently increased pressure gradients arise. In this case the distance between the trays has also to be extended which results in reduction of both specific output and efficiency if compared with small-diameter plants.

The purpose of the present invention and the basic object of the same is to overcome the aforementioned disadvantages and to significantly improve the apparatus for bringing fluid phases into mututal contact.

SUMMARY OF THE INVENTION

In accordance with one feature of our invention we provide an improved apparatus for bringing fluid phases into mutual contact, comprising confining means for confining a fluid phase or phases in an enclosed space, such as substantially vertical cylindrical vessel provided on the two opposite sides thereof with feed means and withdrawing means for supplying and discharging fluid phases thereinto and thereout, respectively, said means being embodied as inlet and outlet ports. The inlet port in the top part of the vessel is designed for introducing a heavier phase or phases whereas the inlet port in the bottom part of the vessel is designed for introducing a lighter phase or phases thereinto. In the interior of said vessel there are provided at least two perforated means disposed one above the other and designed for the passage of the phase or phases in counterflow through the vessel. The perforated means in the form of column trays are provided with alternately spaced apart apertures of two different sizes, the smaller of them designed for passing a dispersed phase or phases, being positioned in one perforated tray opposite the larger apertures in the adjacent perforated tray, and vice versa, the larger apertures being designed for passing a continuous phase or phases through the vessel. The apparatus comprises also means for bringing the perforated trays and said fluid phase or phases into relative movement. In accordance with one embodiment the trays are adapted for an oscillating movement in the interior of the vessel, or, alternatively, they can be stationary; in this case the fluid phase or phases in the vessel are given a pulsating movement by a suitable pulsator.

It has been found that in order to attain the optimum performance of the apparatus, it is most convenient if the area of each larger aperture is at least three times larger than that of the smaller one; further if the number of the larger apertures is at the most 35 per cent of the sum of apertures within one perforated tray; and, finally, if the total area of all apertures in the tray to the overall area of the perforated tray does not exceed a ratio of 1:2.

Further it has been found out that in order to get perfect mutual contact between the fluid phases it is most preferable to provoke a unidirectional helical phase flow in the vessel respective to the axis thereof. This can be obtained in that the larger apertures designed to allow the passage of the continuous phase are provided with tubular extensions simulating various contours of said larger apertures, which extensions either include each an acute angle together with the tray plane, or the axis of their exit openings are oriented tangentially relative to the vessel axis.

The present invention constitutes a significant progress in designing both vibrating and pulsating large-diameter columns. By providing for crossed phase flows in the space between the perforated trays, which a high efficiency of the respective plant depends upon, it is possible to supress all the unfavorable effects resulting from extending the flow path of the continuous phase between the trays. In accordance with the invention it is unnecessary to increase the distances between the particular perforated trays simultaneously with the column diameter increase. It is why both specific output and efficiency of such an arrangement are but very slightly influenced by the column diameter.

Likewise the lay out of large plants on the basis of test studies on small models is made easier in this way.

The apparatus according to the present invention is actually formed with several column units of analogous both design and performance which are disposed in parallel and enclosed in a single chamber. With extremely large units, however, a risk is encountered that due to a not uniform distribution of flows within the column cross-section, a reduction of plant efficiency may take place. This can be avoided by the afore-described orientation of outlet extensions of apertures for discharging the continous fluid phase, which orientation provides the unidirectional helical flow of the continuous fluid phase through the column.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4b is fragmentary axial sectional view of the column embodiment illustrated in FIG. 4a;

FIG. 6b is a similar view as shown in FIGS. 4b or 5b, illustrating the column embodiment according to FIG. 6a;

DESCRIPTION OF THE PREFERRED EMBODIMENTS

Figure 1:
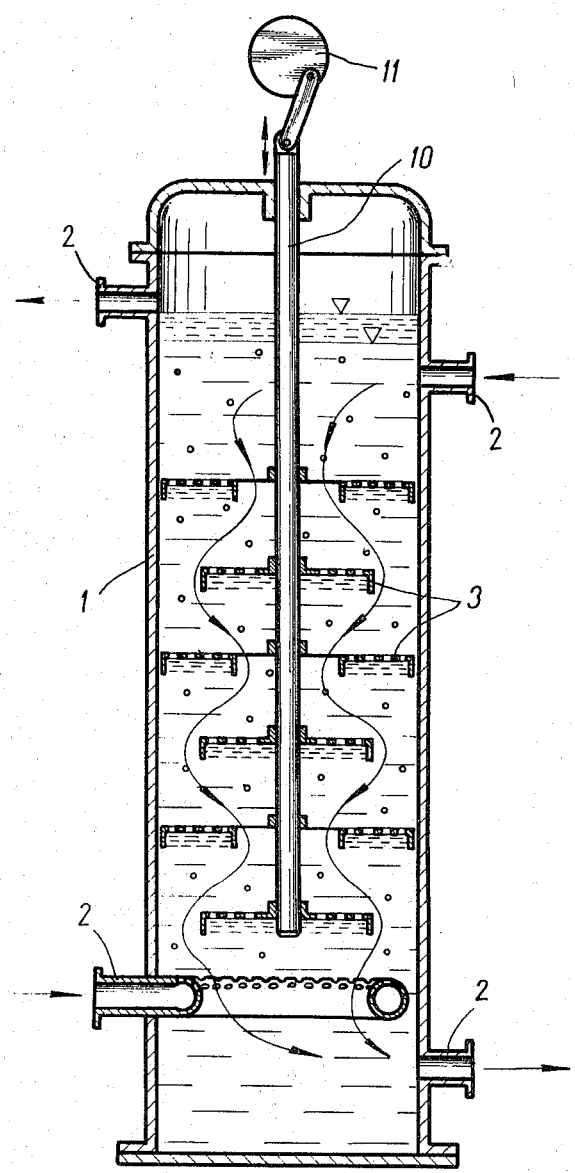
FIG. 1 is a somewhat schematic general vertical sectional view of a column with vibratory trays.

Discussing now the drawing in detail, and particularly FIG. 1 thereof, it can be seen that the column is embodied as an upright cylindrical vessel 1 provided with top and bottom ports 2 designed for phase inlet and outlet, respectively. The interior of the vessel 1 is provided with a set of trays 3 fixedly attached one above the other along a pull rod 10. The pull rod 10 extending substantially through the axis of the vessel 1 is given a vertical reciprocating or vibratory movement from a cam 11.

Figure 2:
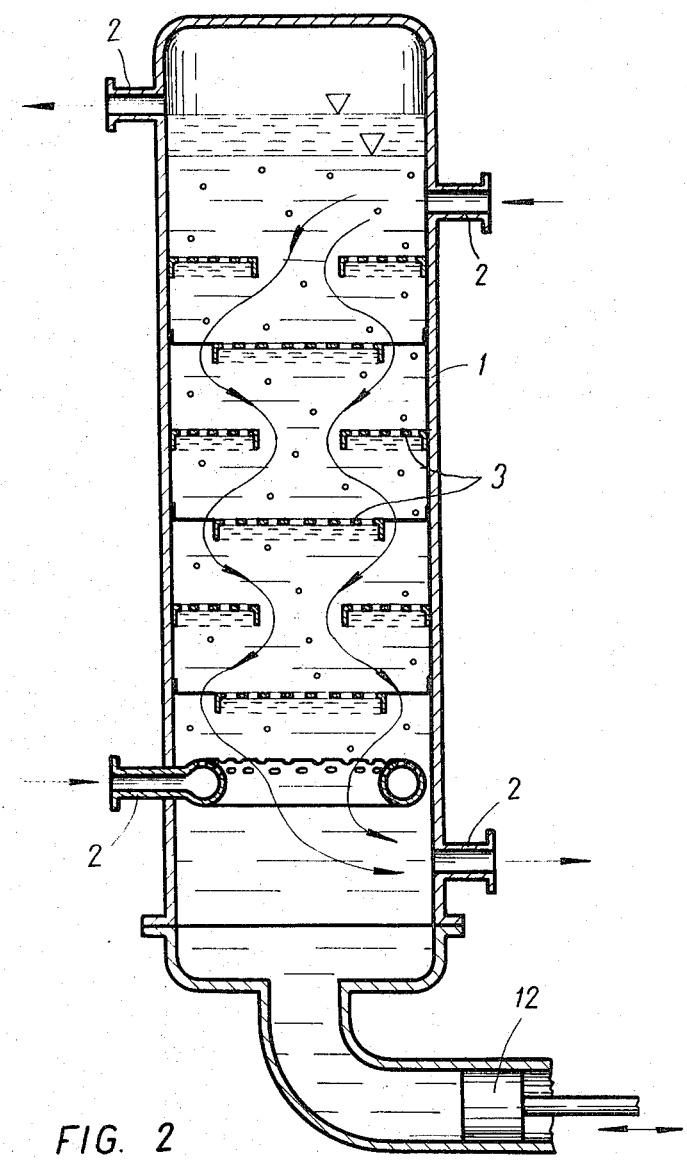
FIG. 2 is a similar view of a column with stationary trays and with a fluid pulsating means.

In FIG. 2 another column embodiment is shown. The upright cylindrical vessel 1 with the phase inlet and outlet ports 2, respectively, is provided in this case with a set of trays 3 secured one above the other to the inner wall of the vessel 1. A fluid in the column is given a pulsating movement by means of a pulsator 12.

As can be seen in FIGS. 1 and 2, the phases are moved through the column or vessel 1 in counterflow direction. In this arrangement, a lighter phase is dispersed when passing apertures of the particular trays 3, and the thus arisen drops ascend through the vessel 1. Adjacent a higher tray 3, the drops get always denser or coalesce to form a continuous layer while due to the passage therethrough they get dispersed again. A heavier phase, on the other hand, descends through the column vessel 1 as indicated by arrows. In the top part of the column vessel 1, the last mentioned phase will finally form a continuous deposit or layer and is discharged through the outlet port 2.

Figure 3:
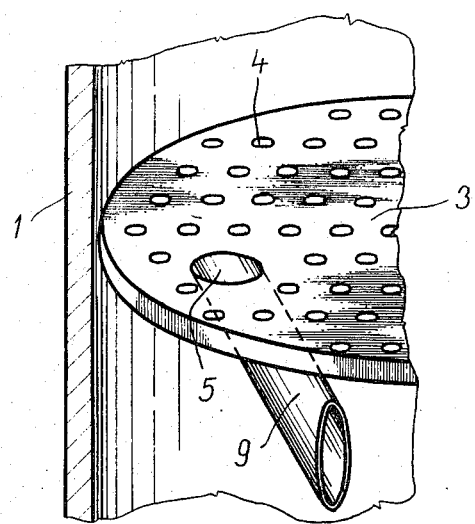
FIG. 3 is a fragmentary detail view of a tray with a larger aperture having a tubular extension including together with the tray plane an acute angle, the outlet opening of said tubular extension pointing tangentially respective to the column axis.

FIG. 3 shows a fragmentary axial sectional view of the vessel 1 with a tray 3 having a plurality of apertures 4 for passing the dispersed phase and a single circular aperture 5 designed for passing the continuous phase. The latter is provided with a tubular extension 9 which is designed for discharging the continuous phase and includes together with the plane of the tray 3 an acute angle, its outlet opening pointing tangentially respective to the column axis.

Figure 4A:
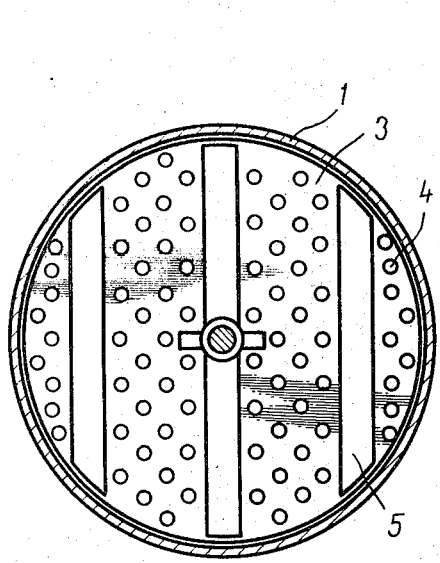
FIG. 4a is a cross-sectional view of a column showing a tray with larger apertures in the form of elongate parallel slots.
Figure 4B:
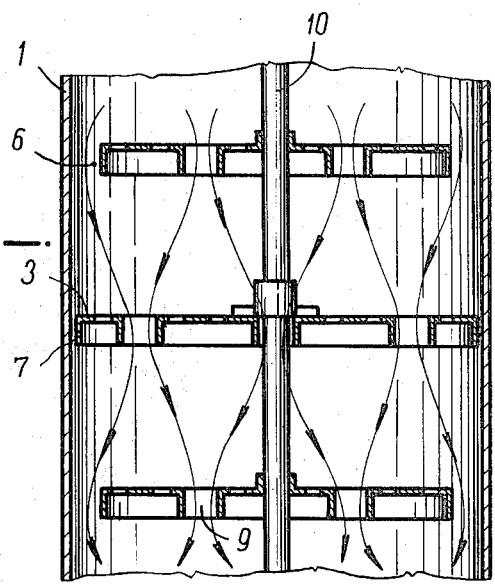

An other column embodiment is shown in FIGS. 4a and 4b. The former is a cross-sectional view of the vessel 1, illustrating a tray 3 provided with smaller circular apertures 4 for the dispersed phase and with larger apertures 5 for the continuous phase which latter apertures have the form of elongate parallel slots. As it can be seen in FIG. 4b which is an axial sectional view of the vessel 1, the positions of the larger apertures 5 alternate within the adjacent trays 3. In this way the flow of the continuous phase between the trays 3 is controlled as to cross the dispersed phase flow. The continuous phase flow course is indicated by arrows in FIG. 4b. The particular trays 3 are provided on the periphery with vertical webs 7. With every second tray 3 the marginal slots or apertures 5 are omitted and their performance is assumed by gaps 6 provided between the tray periphery and the inner wall of the vessel 1. The larger apertures or slots 5 are provided around their periphery with vertically downward disposed flaps or webs corresponding substantially to the extension 9 as shown in FIG. 3.

Figure 5A:
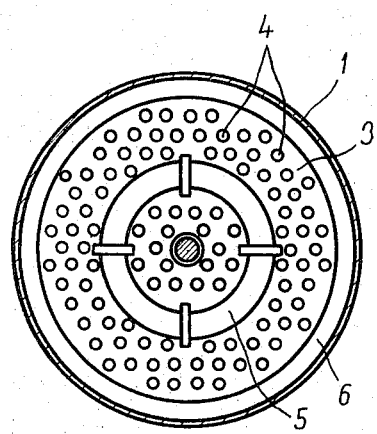
FIG. 5a is a similar view as shown in FIG. 4a, wherein the larger apertures are embodied as concentric annular slots.
Figure 5B:
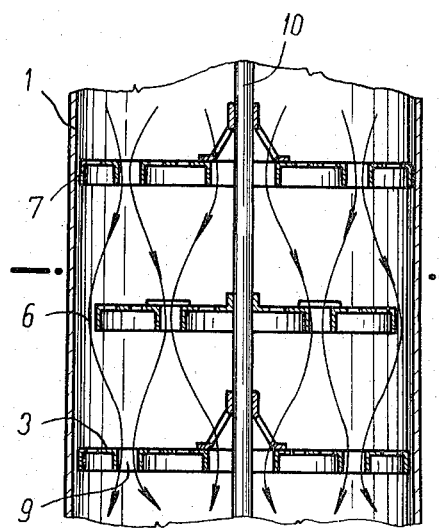
FIG. 5b is a similar view as shown in FIG. 4b, wherein the column embodiment from FIG. 5a is illustrated.

FIG. 5a shows still another column embodimemt wherein in a cross-sectional view of the vessel 1 it can be seen that the tray 3 is provided with small-diameter circular apertures 4 for the dispersed phase and with larger apertures 5 for the continuous phase, in the form of concentric annular slots. In an axial sectional view of the vessel 1 the alternation of slots positions within adjacent trays 3 is apparent (FIG. 5b). Thereby the flow direction of the continous phase is controlled as indicated by arrows in FIG. 5b. Each tray 3 is provided on the periphery with vertical webs 7. With the second tray 3 of which plane view is illustrated in FIG. 5a, one of the larger apertures is formed with a gap 6 provided between the edge of the tray 3 and the inner wall of the vessel 1. The larger apertures 5 for the continuous phase are provided on their circumference with webs forming extensions 9.

Figure 6A:
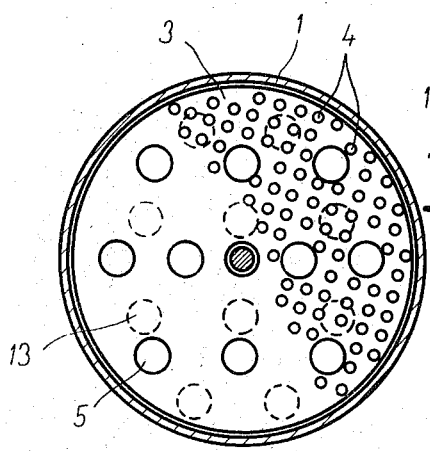
FIG. 6a is a similar view as shown in FIGS. 4a or 5a, the larger apertures being uniformly spaced apart within the tray plane.
Figure 6B:
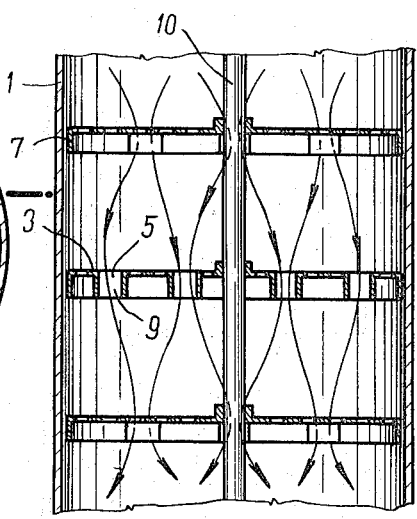

FIGS. 6a and 6b show a modified column embodiment, wherein, as illustrated in cross-sectional view, the tray 3 is provided with smaller apertures 4 for the dispersed phase and with larger circular apertures 5 for the continuous phase, which latter are uniformly spaced apart on the whole tray area. In the axial sectional view 6b there can be seen the staggered positions of the larger apertures in a tray relative to those in the adjacent ones. The positions of the larger apertures 5 in the adjacent perforated tray are indicated in FIG. 6a by dashed lines. The flow direction of the continuous phase is denoted in FIG. 6b by arrows. Each tray 3 is provided with a peripheral web 7. Likewise the larger apertures are provided with downward oriented tubular extensions 9.

Figures 7A, 7B:
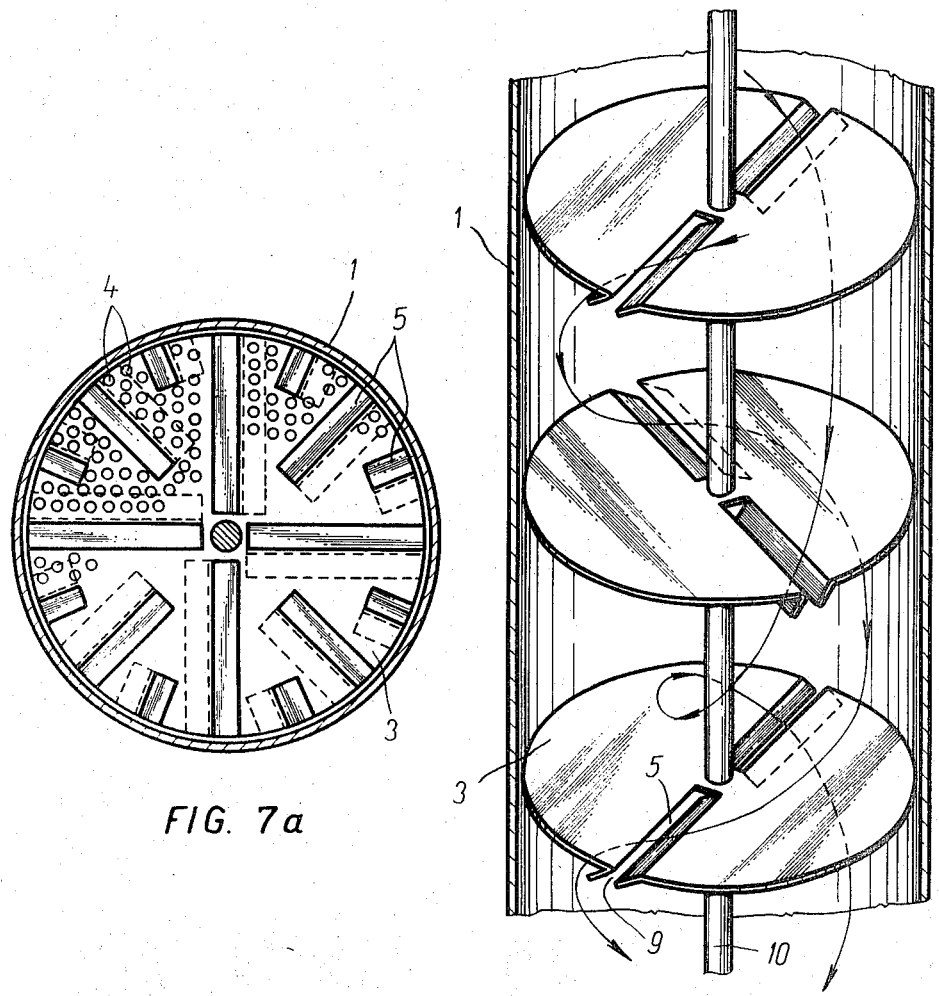
FIG. 7a is a cross-sectional view of a column embodiment wherein the tray is provided with larger apertures in the form of radially disposed slots, the slots in each tray having oppositely slanted downwardly oriented flaps.
FIG. 7b is a perspective view of the tray embodiment illustrated FIG. 7a, showing schematically a helical course of the continuous phase flow through the column interior, controlled by said oppositely slanted flaps.

According to another embodiment of the column the larger apertures 5 are formed as elongate slots extending in radial directions respective to the column axis, as it can be seen in cross-sectional view 7a as well as in a partially axial sectional and partially perspective view 7b. Between said slots the smaller apertures 4 are provided. The lengths of the slots are different as to obtain about the same length of the continuous phase flow path between the adjacent trays within different distances from the column vessel axis. For clarity sake, FIG. 7b depicts but two slots or larger apertures 5 in each tray 3 whereby the relative angular positions thereof are shown. Each aperture 5 is provided on its circumference with slanted webs forming the extension 9 for the outlet of continuous phase. The extensions 9 include each an acute angle with the tray plane are inclined in one and the same rotational sense respective to the axis of the vessel 1. In this manner, together with the relative angular positions of the slots in adjacent trays, a helical flow course of the continuous phase through the column is provoked as indicated by arrows in FIG. 7b.

It will be understood that each of the elements described above, or two or more together may also find a useful application in other types of constructions differing from the types described above.

While the invention has been illustrated and described as embodied in an apparatus for bringing fluid phases into mutual contact, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art clearly constitute essential characteristics of the generic or specific aspects of this invention and therefore, such adaptations should are are intended to be comprehended within the meaning and range of equivalence of the following claims.

What is claimed as new and desired to be protected by Letters Patent is set forth in the appended claims.

1. Apparatus for bringing fluid phases into mutual contact, comprising, in combination, confining means for confining a fluid phase or phases in an enclosed space; feed means and withdrawing means provided on two opposite sides of said enclosed space for supplying and discharging fluid phases thereinto and thereout, respectively; at least two perforated means disposed above one another in said enclosed space and provided each with alternately spaced apart apertures of two different sizes for passing said fluid phases, the smaller of them designed for passing a dispersed phase or phases, being positioned in one perforated means opposite the larger apertures designed for passing a continuous phase, in both upward and downward adjacent perforated means, wherein the larger apertures are provided with extensions which are disposed tangentially respective to the axis of the enclosed space; and means for bringing the perforated means and said fluid phases into relative reciprocating movement.

2. Apparatus for bringing fluid phases into mutual contact, comprising, in combination, confining means for confining a fluid phase or phases in an enclosed space; feed means and withdrawing means provided on two opposite sides of said enclosed space for supplying and discharging fluid phases thereinto and therefrom, respectively; at least two perforated means disposed above one another in said enclosed space and each provided with alternately spaced-apart apertures of two different sizes for passing fluid phases, the smaller of said apertures being designed for passing a dispersed phase or phases and being positioned in one perforated means opposite the larger apertures of the other perforated means which are designed for passing a continuous phase, in both upward and downward adjacent perforated means, said larger apertures being provided with extensions which include an acute angle with the plane of said perforated means; and means for bringing the perforated means and said fluid phases into relative reciprocating movement.

3. Apparatus as defined in claim 2, wherein all said extensions are angularly disposed so as to allow a unidirectional helical flow course of said fluid phase or phases respectively to the axis of the enclosed space.

* * * * *